(12) United States Patent
Hosomi

(10) Patent No.: US 10,185,526 B2
(45) Date of Patent: Jan. 22, 2019

(54) PRINT CONTROLLER, PRINT CONTROL METHOD, AND NON-TRANSITORY RECORDING MEDIUM

(71) Applicant: Masashi Hosomi, Kanagawa (JP)

(72) Inventor: Masashi Hosomi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/673,597

(22) Filed: Aug. 10, 2017

(65) Prior Publication Data

US 2018/0060002 A1 Mar. 1, 2018

(30) Foreign Application Priority Data

Aug. 23, 2016 (JP) ................................ 2016-162843

(51) Int. Cl.
*G06K 15/00* (2006.01)
*G06F 3/12* (2006.01)

(52) U.S. Cl.
CPC ............ *G06F 3/1252* (2013.01); *G06F 3/124* (2013.01); *G06F 3/1205* (2013.01); *G06F 3/1211* (2013.01); *G06F 3/1281* (2013.01)

(58) Field of Classification Search
CPC .... G06F 3/1252; G06F 3/1205; G06F 3/1211; G06F 3/124; G06F 3/1281
USPC ....................................................... 358/1.18
See application file for complete search history.

(56) References Cited

U.S. PATENT DOCUMENTS

| | | | |
|---|---|---|---|
| 2004/0190057 A1* | 9/2004 | Takahashi | G06F 3/1205 358/1.15 |
| 2009/0219576 A1* | 9/2009 | Akiyama | G06K 15/02 358/1.16 |
| 2011/0058204 A1* | 3/2011 | Chae | G06F 3/1213 358/1.13 |

FOREIGN PATENT DOCUMENTS

| | | |
|---|---|---|
| JP | 2012-126024 | 7/2012 |
| JP | 2016-178536 | 10/2016 |

* cited by examiner

*Primary Examiner* — Neil R McLean
(74) *Attorney, Agent, or Firm* — Oblon, McClelland, Maier & Neustadt, L.L.P.

(57) ABSTRACT

A print controller includes a plurality of processing units, a receiving unit, a generation unit, a first assignment unit, a second assignment unit, and a request unit. The generation unit generates print side job data for imposing multiple pages on a single print side. The first assignment unit assigns, to the print side job data, an image processing unit not assigned to other print side job data. The second assignment unit assigns at least one image processing unit not assigned to the other print side job data, to page job data of each of the pages. The request unit requests the at least one image processing unit to execute image processing on the page job data of each page, and requests the image processing unit to execute image processing on the print side job data when the image processing on the page job data of each page is completed.

8 Claims, 11 Drawing Sheets

FIG. 4

| RIP ENGINE ID | PRINT SIDE NO. | PAGE NO. |
|---|---|---|
| 1 | FIRST PRINT SIDE | FIRST PAGE, THIRD PAGE |
| 2 | N/A | SECOND PAGE |

FIG. 5

| JOB ID | PRINT MEDIUM NO. | PRINT SIDE NO. | PAGE NO. | PLOTTING INFORMATION |
|---|---|---|---|---|
| JOB 1 | PRINT MEDIUM 1 | FIRST PRINT SIDE | FIRST PAGE | POSITION (0, 0), ROTATION 0, SCALING 0.5 |
| JOB 1 | PRINT MEDIUM 1 | FIRST PRINT SIDE | SECOND PAGE | POSITION (50, 0), ROTATION 0, SCALING 0.5 |
| JOB 1 | PRINT MEDIUM 2 | SECOND PRINT SIDE | THIRD PAGE | POSITION (0, 0), ROTATION 0, SCALING 0.5 |
| JOB 1 | PRINT MEDIUM 2 | SECOND PRINT SIDE | FOURTH PAGE | POSITION (50, 0), ROTATION 0, SCALING 0.5 |
| ... | ... | ... | ... | ... |

700

PRINT CONTROLLER, PRINT CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2016-162843, filed on Aug. 23, 2016, in the Japan Patent Office, the entire disclosure of which is hereby incorporated by reference herein.

BACKGROUND

Technical Field

The present disclosure relates to a print controller, a print control method, and a non-transitory recording medium storing a program to cause the print controller to perform the print control method.

Related Art

There is known an image processing device capable of executing parallel image processing, such as raster image processing (RIP), using a plurality of central processing units (CPU).

Furthermore, there is a known technique, for example, for executing parallel processing on a per-page basis with respect to a plurality of pages included in a print job in which imposition is designated.

SUMMARY

In an aspect of the present disclosure, there is provided a print controller that includes a plurality of processing units, a receiving unit, a generation unit, a first assignment unit, a second assignment unit, and a request unit. The plurality of processing units is configured to execute image processing. The receiving unit is configured to receive, from a terminal device connected to the print controller, a print job in which imposition printing is set. The generation unit is configured to generate print side job data for imposing a plurality of pages on a single print side, based on information indicating the imposition printing set in the print job received by the receiving unit. The first assignment unit is configured to assign an image processing unit of the plurality of image processing units, which is not assigned to other print side job data for imposing a plurality of pages on another print side, to the print side job data generated by the generation unit. The second assignment unit is configured to assign at least one image processing unit of the plurality of image processing units, which is not assigned to the other print side job data, to page job data of each of the plurality of pages to be imposed on the single print side among a plurality of pieces of page job data included in the print job received by the receiving unit. The request unit is configured to request the at least one image processing unit assigned by the second assignment unit to execute image processing on the page job data of each of the plurality of pages to be imposed on the single print side, and request the image processing unit assigned by the first assignment unit to execute image processing on the print side job data generated by the generation unit when the image processing on the page job data of each of the plurality of pages to be imposed on the single print side is completed.

In another aspect of the present disclosure, there is provided a print control method for a print controller including a plurality of image processing units. The print control method includes receiving, from a terminal device connected to the print controller, a print job in which imposition printing is set; generating print side job data for imposing a plurality of pages on a single print side, based on information indicating the imposition printing set in the print job received by the receiving; first assigning an image processing unit of the plurality of image processing units, which is not assigned to other print side job data for imposing a plurality of pages on another print side, to the print side job data generated by the generating; second assigning at least one image processing unit of the plurality of image processing units, which is not assigned to the other print side job data, to page job data of each of the plurality of pages to be imposed on the single print side among a plurality of pieces of page job data included in the received print job; first requesting the at least one image processing unit assigned by the second assigning to execute image processing on page job data of each of the plurality of pages to be imposed on the single print side; and second requesting the image processing unit assigned by the first assigning to execute image processing on the print side job data when the image processing an the page job data of each of the plurality of pages to be imposed on the single print side is completed.

In another aspect of the present disclosure, there is provided a non-transitory recording medium that stores a program to cause a print controller including a plurality of image processing units to perform a print control method. The print control method includes receiving, from a terminal device connected to the print controller, a print job in which imposition printing is set; generating print side job data for imposing a plurality of pages on a single print side, based on information indicating the imposition printing set in the print job received by the receiving; first assigning an image processing unit of the plurality of image processing units, which is not assigned to other print side job data for imposing a plurality of pages on another print side, to the print side job data generated by the generating; second assigning at least one image processing unit of the plurality of image processing units, which is not assigned to the other print side job data, to page job data of each of the plurality of pages to be imposed on the single print side among a plurality of pieces of page job data included in the received print job; first requesting the at least one image processing unit assigned by the second assigning to execute image processing on the page job data of the plurality of pages to be imposed on the single print side; and second requesting the image processing unit assigned by the first assigning to execute image processing on the print side job data when the image processing on the page job data of each of the plurality of pages to be imposed on the single print side is completed.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a table illustrating an example of engine management information;

FIG. 5 is a table illustrating an example of imposition information;

Figure 1:
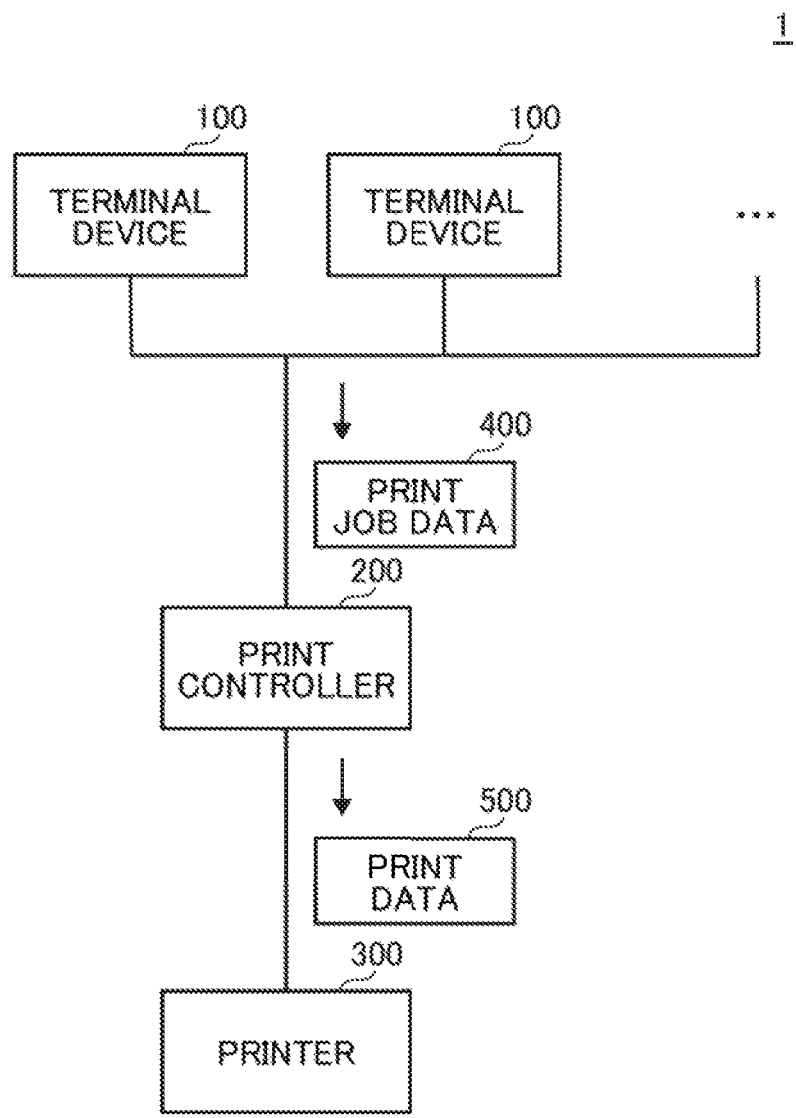
FIG. 1 is a diagram illustrating an exemplary system configuration of a printing system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In a case where a plurality of pages is imposed on one print side, for example, it is required to execute parallel RIP on the plurality of pages and then to execute the RIP on the print side.

However, in such a case, after the plurality of pages being subjected to the RIP, another page to be imposed on another print side may be subjected to the RIP. For this reason, the print side concerned may be kept waiting for the RIP until completion of the RIP on the page to be imposed on another print side. Accordingly, in this case, it may take time to start print processing on a first print side (a print side of a first print medium).

As described below, according to at least one embodiment of the present disclosure, the time up to the start of print processing can be reduced.

An embodiment of the present disclosure will now be described in detail with reference to the drawings.

(System Configuration)

First, a system configuration of a printing system 1 according to the present embodiment will be described with reference to FIG. 1. FIG. 1 is a diagram illustrating an exemplary system configuration of the printing system 1 according to the present embodiment.

As illustrated in FIG. 1, the printing system 1 according to the present embodiment includes at least one terminal device 100, a print controller 200, and a printer 300. The terminal device 100 and the print controller 200 are connected over a network such as a local area network (LAN). The print controller 200 and the printer 300 are connected through a communication line such as an exclusive line.

However, the connection between the terminal device 100 and the print controller 200 is not limited to the LAN. The terminal device 100 and the print controller 200 may be connected with any communication standard. The connection between the terminal device 100 and the print controller 200 may be either wired or wireless. Alternatively, both wired and wireless connection may be mixed. Furthermore, the connection between the print controller 200 and the printer 300 is not limited to the communication line such as the exclusive line. The print controller 200 and the printer 300 may be connected over a network such as a LAN.

The terminal device 100 is, for example, a personal computer (PC). The terminal device 100 generates data 400 indicating a print job (hereinafter referred to as "print job data 400"). The terminal device 100 may be an information processing terminal of any kind such as a smartphone, a tablet terminal, and a mobile phone.

For example, the terminal device 100 generates the print job data 400 according to a print instruction of a user in an application mounted in the terminal device 100, and sends the generated print job data 400 to the print controller 200.

In the present embodiment, for example, assumed that the user of the terminal device 100 performs designation for printing a plurality of pages on one print side collectively (performs imposition printing designation), and then issues a print instruction. Therefore, the terminal device 100 according to the present embodiment generates the print job data 400 including the imposition printing designation.

Examples of the imposition printing include "2 in 1 printing" in which two pages are printed on one print side and "Nth-side face-up printing" in which N number of pages is printed on one prim side. Furthermore, the prim side represents one surface of a print medium printed by the printer 300 (for example, "a from surface of paper" or "a back surface of paper"). Note that the print side is also referred to as a "sheet side", "surface", or "impression".

The print medium is not limited to paper. The print medium may be, for example, coat paper, cardboard, overhead projector (OHP) sheet, plastic film, prepreg, and copper foil.

The print controller 200 is, for example, a digital front end (DFE). Receiving the print job data 400 from the terminal device 100, the print controller 200 executes parallel RIP on job data such as page description language (PDL) data included in the print job data 400 so as to generate print data 500. The print controller 200 then sends the generated print data 500 to the printer 300. The processing of the print controller 200 is not limited to the RIP. The print controller 200 may execute another image processing so as to generate the print data 500.

Herein, the print data 500 includes data indicating an image to be printed on the print side of the print medium by the printer 300 (print side RIP data); and data indicating a setting to be used for printing (for example, a setting of a tray or a stacker to output a printed medium). The print side RIP data is data in which RIP data of a plurality of pages is imposed.

Note that the print controller 200 may be connected to the printer 300 one by one or may be connected to a plurality of printers 300. Furthermore, the print controller 200 and the printer 300 may be configured as one apparatus.

The printer 300 is an image forming apparatus configured to receive the print data 500 from the print controller 200 so as to form an image on the print medium in accordance with the print data 500.

The printing system 1 illustrated in FIG. 1 is an example, and other configurations may also be applied. For example, the printing system 1 may have a configuration without the terminal device 100. Alternatively, the printing system 1 may have a configuration including a plurality of print controllers 200 and a plurality of printers 300.

(Hardware Configuration)

Figure 2:
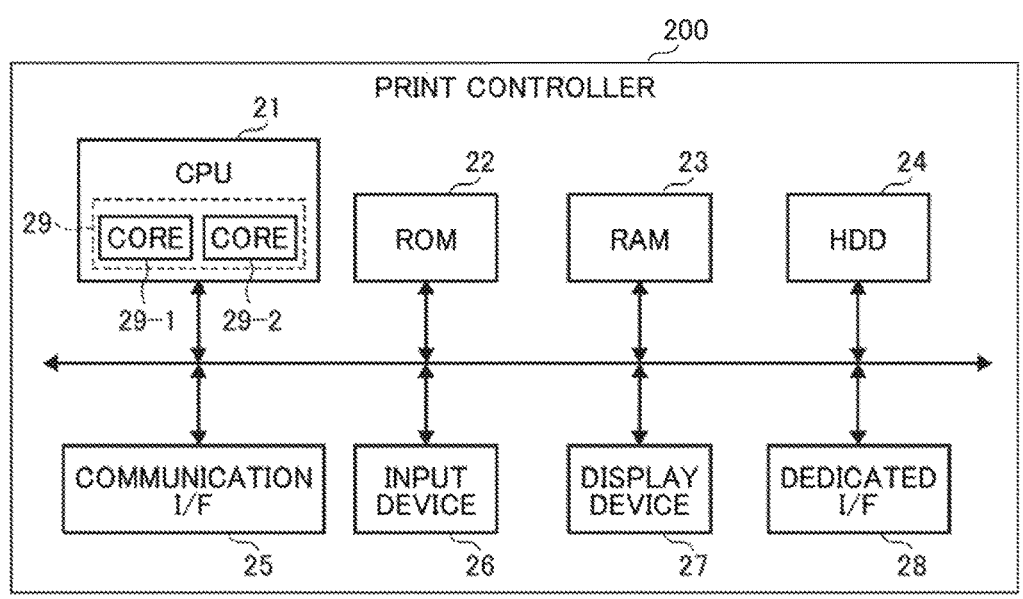
FIG. 2 is a diagram illustrating an exemplary hardware configuration of a print controller according to the present embodiment.

Next, a hardware configuration of the print controller 200 according to the present embodiment will be described with reference to FIG. 2. FIG. 2 is a diagram illustrating an exemplary hardware configuration of the print controller 200 according to the present embodiment.

As illustrated in FIG. 2, the print controller 200 according to the present embodiment includes a CPU 21, a read only memory (ROM) 22, a random access memory (RAM) 23, and a hard disk drive (HDD) 24. The print controller 200 according to the present embodiment also includes a communication interface (I/F) 25, an input device 26, a display device 27, and a dedicated interface (I/F) 28. These pieces of hardware are connected by a bus B.

The input device 26 is, for example, a keyboard, a mouse, and a touch panel, used to input various operations. The display device 27 is a display and the like, configured to display various processing results. Note that at least one of the input device 26 and the display device 27 may be connected to the bus B for use when required.

The RAM 23 is a volatile semiconductor memory that temporarily stores programs and data. The ROM 22 is a nonvolatile semiconductor memory capable of holding data even when the power is turned off.

The HDD 24 is a nonvolatile memory that stores programs and data. Examples of the programs and data stored in the HDD 24 include an operating system (OS) which is basic software to control the entire print controller 200; and various application programs operated in the OS.

The CPU 21 is a processor that reads the programs and data from the HDD 24, the ROM 22, and the like onto the RAM 23 so as to execute various processing. In the present embodiment, assumed that the CPU 21 includes two CPU cores 29, that is, a CPU core 29-1, and a CPU core 29-2. In other words, the CPU 21 is a dual CPU. However, the CPU 21 may be implemented with two single-core CPUs.

Note that the dual core CPU is a CPU having two CPU cores 29 in one processor package. On the other hand, the single-core CPU is a CPU having one CPU core 29 in one processor package.

The communication I/F 25 is an interface to perform data communication with the terminal device 100. Involving the communication I/F 25, the print controller 200 can receive the print job data 400 and the like from the terminal device 100.

The dedicated I/F 28 is an interlace to perform data communication with the printer 300. Involving the dedicated I/F 28, the print controller 200 may be able to send the print data 500 and the like to the printer 300.

The print controller 200 according to the present embodiment has the hardware configuration illustrated in FIG. 2 so that it is possible to achieve the after-mentioned various processing.

Note that the terminal device 100 has a hardware configuration similar to the hardware configuration of the print controller 200, except that the terminal device 100 does not include the dedicated I/F 28. Furthermore, the printer 300 has a hardware configuration similar to the hardware configuration of the print controller 200 except that the printer 300 does not include the communication I/F 25 and includes a plotter and the like.

(Functional Configuration)

Figure 3:
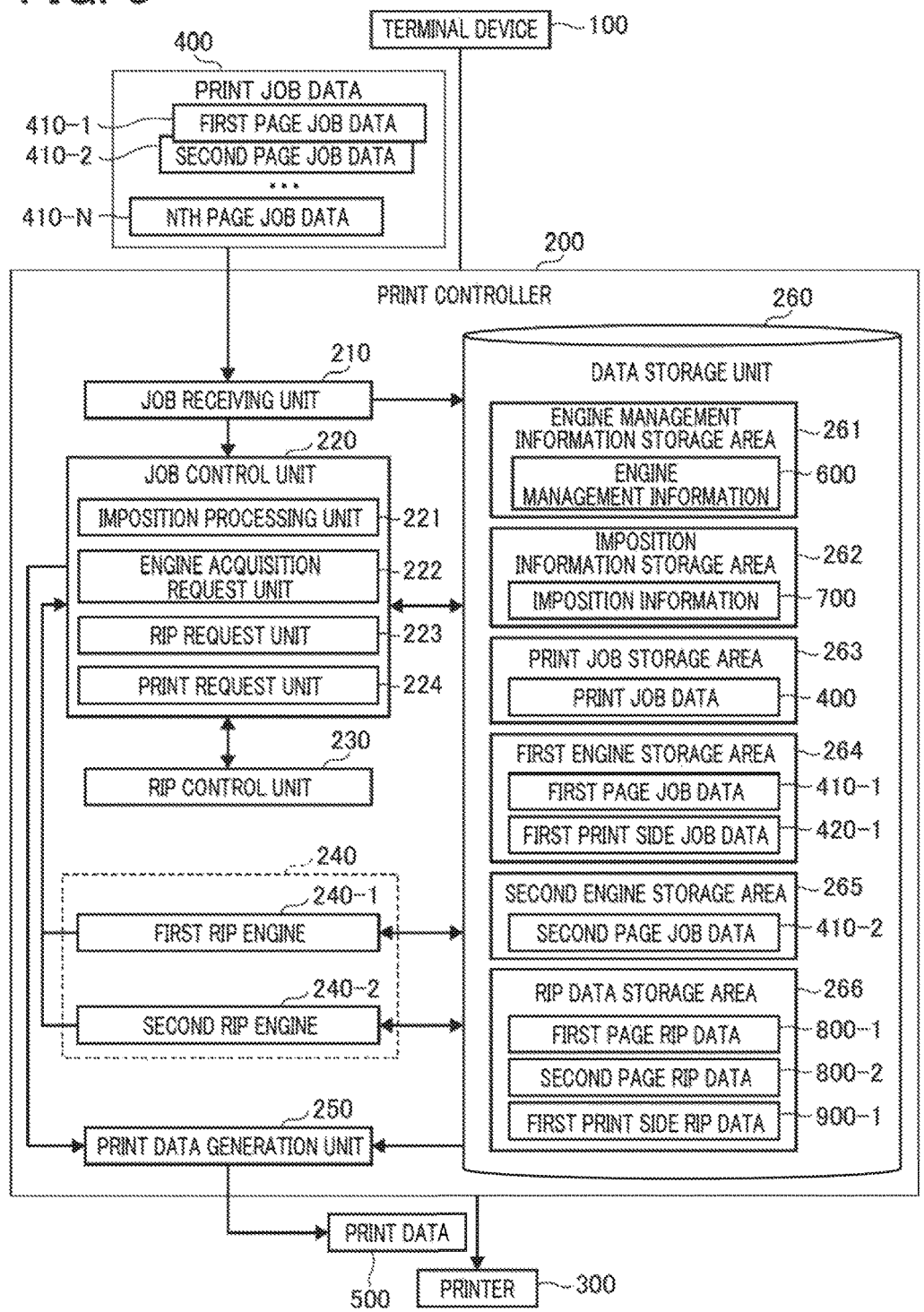
FIG. 3 is a diagram illustrating an exemplary functional configuration of the print controller according to the present embodiment.

Next, a functional configuration of the print controller 200 according to the present embodiment will be described with reference to FIG. 3. FIG. 3 is a diagram illustrating an exemplary functional configuration of the print controller 200 according to the present embodiment.

As illustrated in FIG. 3, the print controller 200 according to the present embodiment includes a job receiving unit 210, a job control unit 220, an RIP control unit 230, a plurality of RIP engines 240, and a print data generation unit 250. These units are implemented as the CPU 21 is made to execute processing by one or more programs installed in the print controller 200.

The print controller 200 according to the present embodiment also includes a data storage unit 260. The data storage unit 260 can be implemented with, for example, the RAM 23, and the HDD 24. Note that the data storage unit 260 may be implemented with a storage device and the like connected to the print controller 200.

The job receiving unit 210 receives the print job data 400 generated by the terminal device 100.

The job receiving unit 210 stores the received print job data 400 in a print job storage area 263 included in the data storage unit 260. The job receiving unit 210 then sends the print job data 400 stored in the print job storage area 263 to the job control unit 220.

Herein, the print job data 400 includes job data 410 on a per-page basis (hereinafter also referred to as "page job data 410"). In other words, the print job data 400 includes a first page job data 410-1 indicating job data 410 of a first page; and a second page job data 410-2 indicating job data 410 of a second page. Similarly, the print job data 400 includes Nth page job data 410-N indicating job data 410 of the Nth page.

Note that the job data 410 included in the print job data 400 may not be on a per-page basis such as PostScript data.

The job control unit 220 executes processing for generating the print data 500 from the print job data 400 (for example, generation of print side job data 420 to be described, an acquisition request of the RIP engines 240, and an RIP request). Herein, the job control unit 220 includes an imposition processing unit 221, an engine acquisition request unit 222, a RIP request unit 223, and a print request unit 224.

The imposition processing unit 221 acquires imposition information 700 stored in an imposition information storage area 262 included in the data storage unit 260. Based on the imposition information 700, the imposition processing unit 221 generates job data 420 (hereinafter referred to as the "print side job data 420"). The imposition processing unit 221 then stores the generated print side job data 420 in storage areas to be described (a first engine storage area 264 or a second engine storage area 265) corresponding to the RIP engines 240 assigned by the engine acquisition request unit 222. Details of the imposition information 700 will be described later.

Note that the imposition information 700 is included, for example, in the print job data 400. In this case, the job receiving unit 210 acquires the imposition information 700 from the print job data 400, and then stores the imposition information 700 in the imposition information storage area 262. Furthermore, the imposition information 700 may be created by the user with the input device 26 and the like of the print controller 200.

Herein, the print side job data 420 is for generating data (page RIP data 800 to be described) obtained by executing the RIP on the page job data 410, and data (print side RIP data 900 to be described) imposed per print side.

In a case where the number of print sides of a print medium is M (for example, in a case where 2×M pages of document tiles and the like are subject to single-side printing with "2 in 1 printing"), the imposition processing unit 221 generates first print side job data 420-1 indicating the print side job data 420 of a first print side. Similarly, the imposition processing unit 221 generates second print side job data 420-2 indicating the print side job data 420 of a second print side, . . . , and Lth print side job data 420-L indicating the print side job data 420 of an Lth print side.

It should be noted that two print sides (for example, the front and back sides) may be on one print medium, or one print side (for example, the front side) may be on one print medium.

The engine acquisition request unit 222 requests the RIP control unit 230 to acquire an RIP engine 240 for executing the RIP on the page job data 410 and the print side job data 420. The engine acquisition request unit 222 then assigns the RIP engine 240 responded from the RIP control unit 230 to the page job data 410 and the print side job data 420.

In a case where the RIP control unit 230 responds to a plurality of RIP engines 240, among those RIP engines 240, the engine acquisition request unit 222 assigns an RIP engine 240 having the smallest imposition number of the page job data 410.

At this time, the engine acquisition request unit 222 manages the RIP engine 240 in engine management information 600 stored in an engine management information storage area 261 included in the data storage unit 260, to assign the RIP engine 240. Details of the engine management information 600 will be described later.

The RIP request unit 223 requests the RIP engines 240 to execute the RIP on the page job data 410 and the print side job data 420. In other words, the RIP request unit 223 requests an RIP engine 240 assigned to the page job data 410 to execute the RIP on the page job data 410. Similarly, the RIP request unit 223 requests an RIP engine 240 assigned to the print side job data 420 to execute the RIP on the print side job data 420.

When the after-mentioned print side RIP data 900 is generated by an RIP engine 240, the print request unit 224 requests the print data generation unit 250 to generate the print data 500.

In response to the request from the engine acquisition request unit 222, the RIP control unit 230 specifies an available RIP engine 240, and then replies to the engine acquisition request unit 222 with information from which the specified RIP engine 240 is identified (that is, an RIP engine ID).

Herein, the RIP control unit 230 specifies an RIP engine 240 that is not assigned toother print side job data 420 as the available RIP engine 240.

Specifically, for example, assumed that the RIP control unit 230 receives an acquisition request of an RIP engine 240 of the second print side job data 420-2. In this case, among the plurality of RIP engines 240, the RIP control unit 230 specifies an RIP engine 240 to which no first print side job data 420-1 is assigned.

Similarly, for example, assumed that the RIP control unit 230 receives an acquisition request of an RIP engine 240 of third page job data 410-3 to be assigned to the second print side. In this case, among the plurality of RIP engines 240, the RIP control unit 230 specifies an RIP engine 240 to which no first print side job data 420-1 is assigned.

The RIP engines 240 executes the RIP on the page job data 410 and the print side job data 420.

In other words, an RIP engine 240 executes the RIP on the page job data 410 to generate the page RIP data 800. The RIP engine 240 then stores the generated page RIP data 800 in an RIP data storage area 266 included in the data storage unit 260.

In addition, an RIP engine 240 executes the RIP on the print side job data 420 to generate the print side RIP data 900. The RIP engine 240 then stores the generated print side RIP data 900 in the RIP data storage area 265 included in the data storage unit 250.

In the following description, page RIP data 800 generated by executing the RIP on the first page job data 410-1 is referred to as a "first page RIP data 800-1". Similarly, page RIP data 800 generated by executing the RIP on Nth page job data 410-N is referred to as an "Nth page RIP data 800-N".

Furthermore, in the following description, print side RIP data 900 generated by executing the RIP on the first print side job data 420-1 is referred to as a "first print side RIP data 900-1". Similarly, print side RIP data 900 generated by executing the RIP on the Mth print side job data 420-L is referred to as an "Mth print side RIP data 900-M".

In the present embodiment, assumed that there are two RIP engines 240, that is, a first RIP engine 240-1 and a second RIP engine 240-2. However, the number of the RIP engines 240 may be two or more.

It should be noted that the first RIP engine 240-1 is implemented in particular as one or more programs installed in the print controller 200 make, for example, the CPU core 29-1 execute processing. Whereas, the second RIP engine 240-2 is implemented in particular as one or more programs installed in the print controller 200 make, for example, the CPU core 29-2 execute processing. In this manner, the first RIP engine 240-1 and the second RIP engine 240-2 are implemented by the processing executed by different CPU cores 29.

The print data generation unit 250 generates the print data 500 in response to a request from the job control unit 220. As described above, note that the print data 500 includes the print side RIP data 900; and the data indicating the setting to be used for printing (for example, the setting of the tray or stacker to output the printed medium).

The data storage unit 260 stores various data. The data storage unit 260 includes the engine management information storage area 261, imposition information storage area 262, print job storage area 263, first engine storage area 264, second engine storage area 265, and RIP data storage area 266.

The engine management information storage area 261 stores the engine management information 600. The engine management information 600 will now be described with reference to FIG. 4. FIG. 4 is a table illustrating an example of the engine management information 600.

As illustrated in FIG. 4, the engine management information 600 includes the "RIP engine ID", "print side No.", and "page No." as items of data.

In the "RIP engine ID", information for identifying an RIP engine 240 is set. In the engine management information 600 illustrated in FIG. 4, the following items are set: that is, an RIP engine number "1" for identifying the first RIP engine 240-1; and an RIP engine number "2" for identifying the second RIP engine 240-2.

In the "print side No.", information for identifying a print side of print side job data 420 assigned to an RIP engine 240 is set. In the engine management information 600 illustrated in FIG. 4, the RIP engine number "1" indicating the first RIP engine 240-1 is associated with a print side number "first print side". This indicates that the first print side job data 420-1 is assigned to the first RIP engine 240-1.

On the other hand, the RIP engine number "2" indicating the second RIP engine 240-2 is associated with "N/A". This indicates that the print side job data 420 is not assigned to the second RIP engine 240-2.

In the "page No.", information for identifying a page of page job data 410 assigned to an RIP engine 240 is set. In the engine management information 600 illustrated in FIG. 4, the RIP engine number "1" indicating the first RIP engine 240-1 is associated with a page number "first page" and a page number "third page". This indicates that the first page job data 410-1 and the third page job data 410-3 are assigned to the first RIP engine 240-1.

Furthermore, in the engine management information 600 illustrated in FIG. 4, the RIP engine number "2" indicating the second RIP engine 240-2 is associated with a page number "second page". This indicates that the second page job data 410-2 is assigned to the second RIP engine 240-2.

As described above, in the engine management information 600 stored in the engine management information storage area 261, the page job data 410 and the prim side job data 420 assigned to the RIP engines 240 are managed for each RIP engine 240.

The imposition information storage area 262 stores the imposition information 700. The imposition information 700 will now be described with reference to FIG. 5. FIG. 5 is a table illustrating an example of imposition information 700.

As illustrated in FIG. 5, the imposition information 700 includes a "job ID", "print medium No.", "print side No.", "page No.", and "plotting information" as items of data.

In the "job ID", information for identifying print job data is set. In the imposition information 700 illustrated in FIG. 5, the number "1" is set.

In the "print medium No.", information for identifying each print medium is set. In the imposition information 700 illustrated in FIG. 5, a print medium number "print medium 1" is set. This indicates that, for example, when the print medium is paper, the print medium is a first sheet of paper. Accordingly, for example, when a print medium number "print medium 2" is set, this indicates that the print medium is a second sheet of paper.

In the "print side No.", information for identifying a print side to which the page RIP data 800 is to be assigned is set. In the "page No.", information for identifying a page is set. In the "plotting information", what is set is plotting information (a plotting start position, a rotation angle, a scaling factor, and the like) in a print side set by the "print side No." when the page RIP data 800 is assigned to the print side.

In the imposition information 700 illustrated in FIG. 5, the job ID "job 1", print medium number "print medium 1", print side number "first print side", page number "first page", and plotting information "position (0, 0), rotation 0, scaling 0.5" are associated with each other. This indicates that the first page RIP data 800-1 is scaled "0.5 times" and imposed at the position of "position (0, 0)" on the "first print side" of the "print medium 1" (for example, the first sheet of paper) (for example, the front side of the first sheet of paper).

Furthermore, in the imposition information 700 illustrated in FIG. 5, the job ID "job 1", print medium number "print medium 1", print side number "first print side, page number "second page", and plotting information "position (50, 0), rotation 0, scaling 0.5" are associated with each other. This indicates that a second page RIP data 800-2 is scaled "0.5 times" and imposed at the position of "position (50, 0)" on the "first print side" of the "print medium 1" (for example, the first sheet of paper) (for example, the front side of the first sheet of paper).

Similarly, in the imposition information 700 illustrated in FIG. 5, the job ID "job 1", print medium number "print medium 2", print side number "second print side", page number "third page", and plotting information "position (0, 0), rotation 0, scaling 0.5" are associated with each other. This indicates that a third page RIP data 800-3 is scaled "0.5 times" and imposed at the position of "position (0, 0)" on the "second print side" of the "print medium 2" (for example, the second sheet of paper) (for example, the front side of the second sheet of paper).

Furthermore, in the imposition information 700 illustrated in FIG. 5, the job ID "job 1", print medium number "print medium 2", print side number "second print side", page number "fourth page", and plotting information "position (50, 0), rotation 0, scaling 0.5" are associated with each other. This indicates that a fourth page RIP data 800-4 is scaled "0.5 times" and imposed at the position of "position (50, 0)" on the "second print side" of the "print medium 2" (for example, the second sheet of paper) (for example, the front side of the second sheet of paper).

In such manners, in the imposition information 700 stored in the imposition information storage area 262, a page to be imposed on a print side and plotting information in regard to the imposition of the page are associated with each other for each print medium and for each print side.

Figure 6:
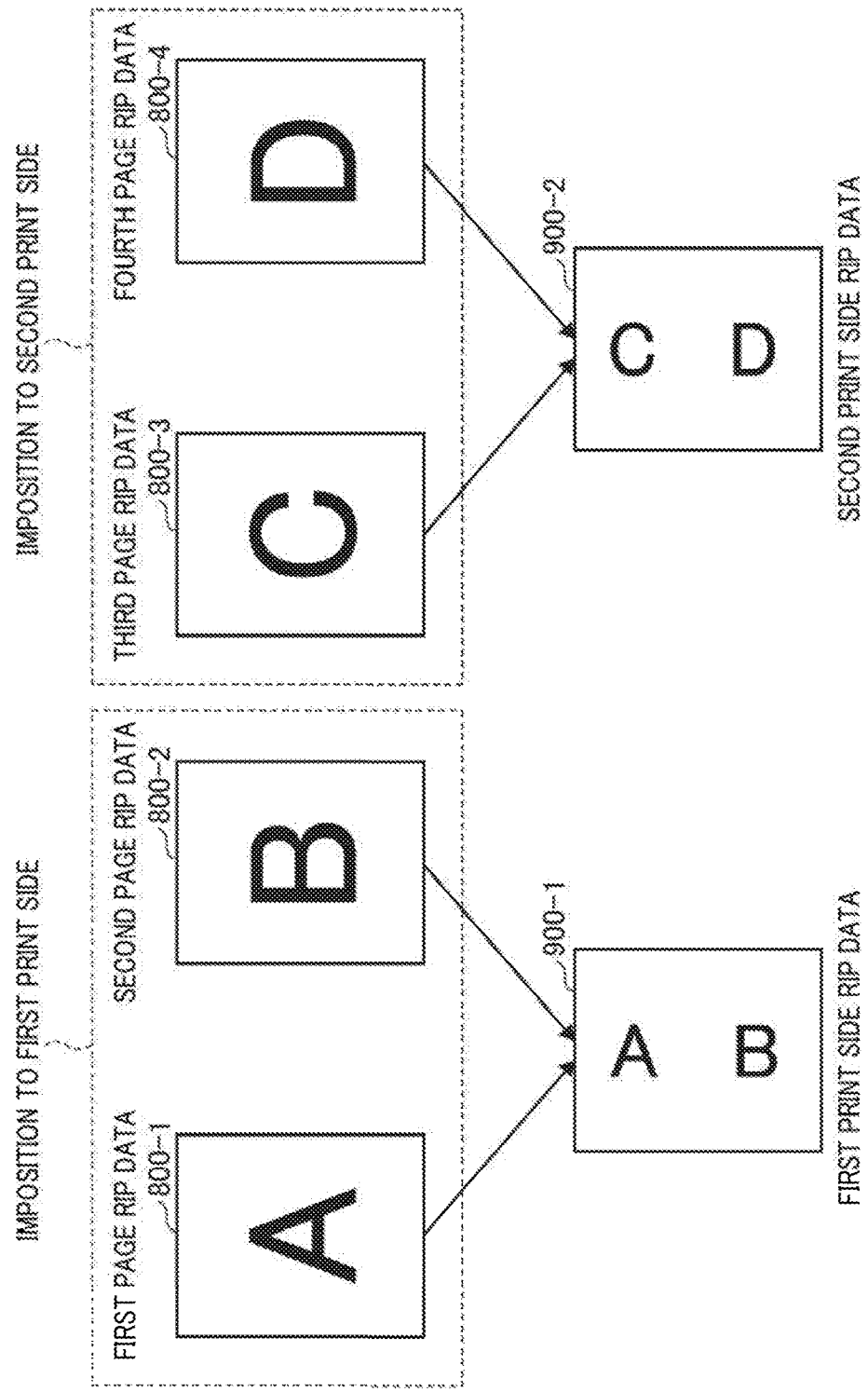
FIG. 6 is a diagram for explaining a relationship between page RIP data and print side RIP data.

A relationship between the page RIP data 800 and the print side RIP data 900 will now be described with reference to FIG. 6. FIG. 6 is a diagram for explaining the relationship between the page RIP data 800 and the print side RIP data 900.

FIG. 6 illustrates an exemplary case where the page RIP data 800 corresponding to two pages are imposed on one print side. In this case, an RIP engine 240 executes the RIP on the print side job data 420 generated by the imposition processing unit 221, and generates the print side RIP data 900 on which the page RIP data 800 corresponding to two pages are imposed.

In other words, as illustrated in FIG. 6, assumed that the first page RIP data 800-1 and the second page RIP data 800-2 are imposed on the first print side. In this case, an RIP engine 240 executes the RIP on the first print side job data 420-1 and generates the first print side RIP data 900-1 including an image obtained by scaling or rotating the first page RIP data 800-1 and the second page RIP data 800-2.

Similarly, as illustrated in FIG. 6, assumed that the third page RIP data 800-3 and the fourth page RIP data 800-4 are imposed on the second print side. In this case, an RIP engine 240 executes the RIP on the second print side job data 420-2 and generates the second print side RIP data 900-2 including an image obtained by scaling or rotating the third page RIP data 800-3 and the fourth page RIP data 800-4.

In such manners, the print side RIP data 900 includes an image obtained by scaling or rotating the page RIP data 800 of a page to be imposed on a print side. It should be noted that the print side job data 420 is generated by the imposition processing unit 221 based on the imposition information 700 as described above.

The print job storage area 263 stores the print job data 400 received by the job receiving unit 210.

The first engine storage area 264 stores the page job data 410 and the print side job data 420 imposed on the first RIP engine 240-1. The second engine storage area 265 stores the page job data 410 and the print side job data 420 assigned to the second RIP engine 240-2.

The RIP data storage area 266 stores the page RIP data 800 and the print side RIP data 900 generated by the RIP engines 240.

<Operation of Each Part of the Print Controller 200>

Figure 7:
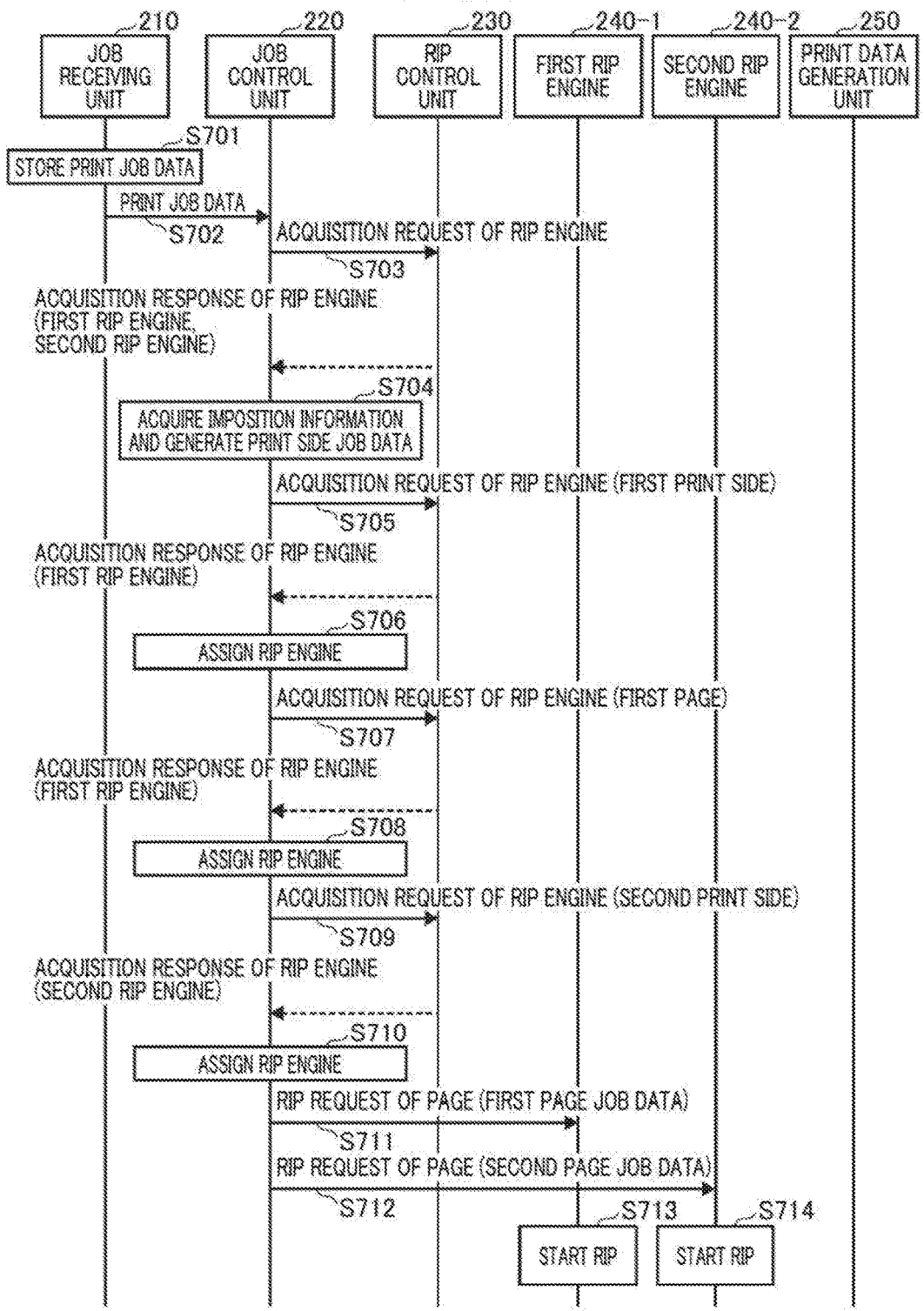
FIG. 7 is a diagram (1/2) illustrating an example of an operation of each unit when the print controller receives print job data.
Figure 8:
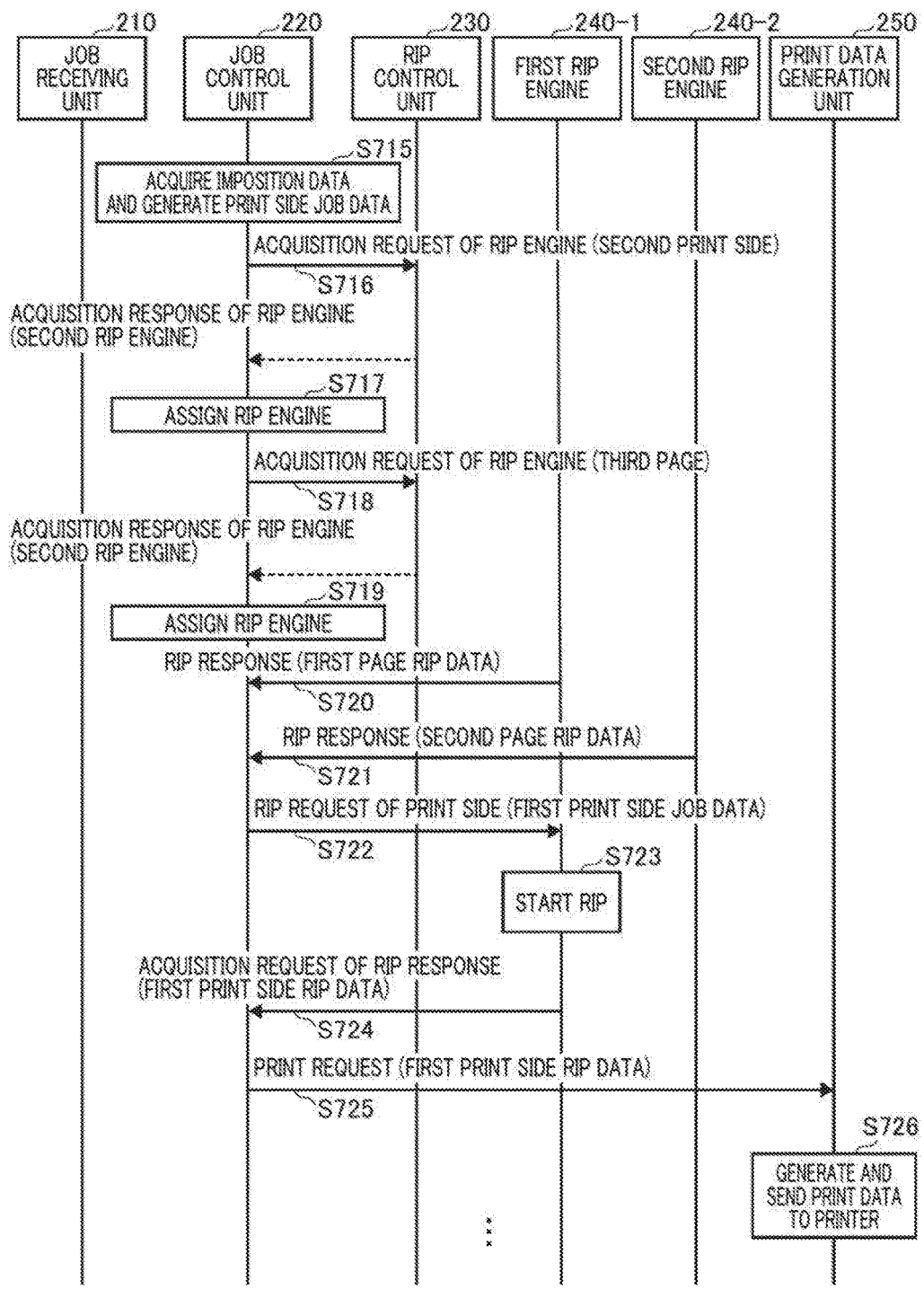
FIG. 8 is a diagram (2/2) illustrating an example of an operation of each unit when the print controller receives print job data.

Next, an operation of each part when the print controller 200 receives the print job data 400 will be described with reference to FIGS. 7 and 8. FIGS. 7 and 8 are diagrams illustrating examples of the operation of each part when the print controller 200 receives the print job data 400. FIG. 7 illustrates an exemplary case where the page RIP data 800 corresponding to two pages are imposed on one print side, and one print medium includes one print side (that is, for example, single-side printing with "2 in 1 printing").

Receiving the print job data 400 generated by the terminal device 100, the job receiving unit 210 firstly stores the print job data 400 in the print job storage area 263 (step S701). In a case where the imposition information 700 is included in the print job data 400, the job receiving unit 210 firstly acquires the imposition information 700 and then stores the imposition information 700 in the imposition information storage area 262.

Next, the job receiving unit 210 sends the print job data 400 stored in the print job storage area 263 to the job control unit 220 (step S702). The job receiving unit 210 may also send to the job control unit 220 an address, password, and the like of a destination to store the print job data 400 stored in the print job storage area 263.

The engine acquisition request unit 222 of the job control unit 220 sends an acquisition request of the RIP engines 240 to the RIP control unit 230 (step S703). The RIP control unit 230 secures the first RIP engine 240-1 and the second RIP engine 240-2 to be used in the print job data 400 stored in step S701 so as to send an acquisition response of the RIP engines 240.

In this manner, the RIP control unit 230 secures the RIP engines 240 to be used in the print job data 400 for each print job data 400. Therefore, in a step to be described (for example, step S705), the RIP control unit 230 specifies an available RIP engine 240 among the RIP engines 240 secured for each print job data 400. However, the RIP control unit 230 is not limited to such processing. For example, the RIP control unit 230 may share an RIP engine 240 among a plurality of pieces of print job data 400.

Note that the acquisition response of the RIP engines 240 includes, for example, RIP engine IDs of the RIP engines 240 which are secured to be used in the print job data 400 stored in step S701.

In a case where the RIP control unit 230 may not be able to secure the RIP engines 240 (for example, when another print job data 400 is being used), the RIP control unit 230 sends to the job control unit 220 an acquisition response indicating that no RIP engine 240 is secured. In this case, for example, it is preferable that the job control unit 220 re-sends an acquisition request of the RIP engines 240 to the RIP control unit 230 after a predetermined time has elapsed.

The imposition processing unit 221 of the job control unit 220 acquires the imposition information 700 stored in the imposition information storage area 262, and generates the first print side job data 420-1 based on the acquired imposition information 700 (step S704).

Herein, the first print side job data 420-1 includes information (such as a page number) indicating the first page job data 410-1 for generating the first page RIP data 800-1 to be imposed on the first print side. Similarly, the first print side job data 420-1 includes information (such as a page number) indicating the second page job data 410-2 for generating the second page RIP data 800-2 to be imposed on the first print side.

Next, the engine acquisition request unit 222 of the job control unit 220 sends an acquisition request of the RIP engines 240 to the RIP control unit 230 (step S705). Note that the acquisition request includes the print side number "first print side".

The RIP control unit 230 specifies an available RIP engine 240, and then replies with the RIP engine ID of the specified RIP engine 240. Hereinafter, assumed that the RIP control unit 230 specifies the availability of the first RIP engine 240-1, and then replies with the RIP engine ID "1" of the first RIP engine 240-1.

The engine acquisition request unit 222 of the job control unit 220 associates the RIP engine ID "1" replied from the RIP control unit 230 with the print side number "first print side", and then stores the RIP engine ID "1" in the engine management information 600 (step S706). Accordingly, the first RIP engine 240-1 is assigned to the first print side job data 420-1.

Next, the engine acquisition request unit 222 of the job control unit 220 sends an acquisition request of the RIP engines 240 to the RIP control unit 230 (step S707). Note that the acquisition request includes the page number "first page".

Herein, the job control unit 220 may acquire the page number included in the acquisition request of the RIP engines 240 from, for example, the first print side job data 420-1. The job control unit 220 may also acquire the page number from the imposition information 700.

The RIP control unit 230 specifies an available RIP engine 240, and then replies with the RIP engine ID of the specified RIP engine 240. Hereinafter, assumed that the RIP control unit 230 specifies the availability of the first RIP engine 240-1, and then replies with the RIP engine ID "1" of the first RIP engine 240-1.

The engine acquisition request unit 222 of the job control unit 220 associates the RIP engine ID "1" replied from the RIP control unit 230 with the print side number "first print side" and the page number "first page", and then stores the RIP engine ID "1" in the engine management information 600 (step S708). Accordingly, the first RIP engine 240-1 is assigned to the first page job data 410-1.

Next, the engine acquisition request unit 222 of the job control unit 220 sends an acquisition request of the RIP engines 240 to the RIP control unit 230 (step S709). Note that the acquisition request includes the page number "second page".

Herein, as described above, the job Control unit 220 may acquire the page number included in the acquisition request of the REP engines 240 from, for example, the first print side job data 420-1. The job control unit 220 may also acquire the page number from the imposition information 700.

The RIP control unit 230 specifies an available RIP engine 240, and then replies with the RIP engine ID of the specified RIP engine 240. Hereinafter, assumed that the RIP control unit 230 specifies the availability of the second RIP engine 240-2, and then replies with the RIP engine ID "2" of the second RIP engine 240-2.

The engine acquisition request unit 222 of the job control unit 220 associates the RIP engine ID "2" replied from the RIP control unit 230 with the print side number "first print side" and the page number "second page", and then stores the RIP engine ID "2" in the engine management information 600 (step S710). Accordingly, the second RIP engine 240-2 is assigned to the second page job data 410-2.

The RIP request unit 223 of the job control unit 220 sends an RIP request of the page to the first RIP engine 240-1 (step S711). Note that the processing request includes the first page job data 410-1. However, in place of the first page job data 410-1, the processing request may include an address, password, and the like of a destination to store the first page job data 410-1.

Furthermore, the RIP request unit 223 of the job control unit 220 sends an RIP request of the page to the second RIP engine 240-2 (step S712). Note that the processing request includes the second page job data 410-2. However, in place of the second page job data 410-2, the processing request may include an address, password, and the like of a destination to store the second page job data 410-2.

In step S711, the page job data 410 is included in the RIP request, but should not be limited thereto. For example, the REP request unit 223 may firstly send a start request of the RIP to an RIP engine 240, and then send to the RIP engine 240 the page job data 410 to which the RIP engine 240 is assigned.

Receiving the RIP request of the page, the first RIP engine 240-1 starts the RIP on the first page job data 410-1 included in the processing request (step S713). Similarly, as the second RIP engine 240-2 receives the RIP request of the page, the second RIP engine 240-2 starts the RIP on the second page job data 410-2 included in the processing request (step S714).

In such manners, the print controller 200 according to the present embodiment executes the parallel RIP on the page job data for generating the page RIP data to be imposed on the identical print side, using the plurality of RIP engines 240. It should be noted that the RIP request in step S711 may be executed, for example, right after step S708.

Next, the imposition processing unit 221 of the job control unit 220 acquires the imposition information 700 stored in the imposition information storage area 262, and generates the second print side job data 420-2 based on the acquired imposition information 700 (step S715).

Herein, the second print side job data 420-2 includes information (such as a page number) indicating the third page job data 410-3 for generating the third page RIP data 800-3 to be imposed on the second print side. Similarly, the second print side job data 420-2 includes information (such as a page number) indicating the fourth page job data 410-4 for generating the fourth page RIP data 800-4 to be imposed on the second print side.

Next, the engine acquisition request unit 222 of the job control unit 220 sends an acquisition request of the RIP engines 240 to the RIP control unit 230 (step S716). Note that the acquisition request includes the print side number "second print side".

The RIP control unit 230 specifies an available RIP engine 240, and then replies with the RIP engine ID of the specified RIP engine 240.

Herein, the first print side job data 420-1 is assigned to the first RIP engine 240-1 so that the RIP control unit 230 specifies the second RIP engine 240-2 as being available. Therefore, the RIP control unit 230 replies the RIP engine ID "2" of the second RIP engine 240-2.

In such manners, the RIP control unit 230 specifies an RIP engine 240, as being available, other than the RIP engine 240 to which another print side job data 420 is assigned.

The engine acquisition request unit 222 of the job control unit 220 associates the RIP engine ID "2" replied from the RIP control unit 230 with the print side number "second print side", and then stores the RIP engine ID "2" in the engine management information 600 (step S717). Accordingly, the second RIP engine 240-2 is assigned to the second print side job data 420-2.

Next, the engine acquisition request unit 222 of the job control unit 220 sends an acquisition request of the RIP engines 240 to the RIP control unit 230 (step S718). Note that the acquisition request includes the page number "third page".

The job control unit 220 may acquire the page number included in the acquisition request of the RIP engines 240 from, for example, the second print side job data 420-2. The job control unit 220 may also acquire the page number from the imposition information 700.

The RIP control unit 230 specifies an available RIP engine 240, and then replies with the RIP engine ID of the specified RIP engine 240.

Herein, the first print side job data 420-1 is assigned to the first RIP engine 240-1 so that the RIP control unit 230 specifies the second RIP engine 240-2 as being available. Therefore, the RIP control unit 230 replies the RIP engine ID "2" of the second REP engine 240-2.

In such manners, the RIP control unit 230 specifies an RIP engine 240, as being available, other than the RIP engine 240 to which the print side job data 420 of a print side is assigned, the print side being different from the print side on which the page RIP data 800 corresponding to the page number included in the acquisition request of the RIP engines 240 is to be imposed.

The engine acquisition request unit 222 of the job control unit 220 associates the RIP engine ID "2" replied from the RIP control unit 230 with the print side number "second print side" and the page number "third page", and then stores the RIP engine ID "2" in the engine management information 600 (step S719). Accordingly, the second RIP engine 240-2 is assigned to the third page job data 410-3.

It should be noted that the processing in steps S715 to S719 may be executed in parallel with the RIP in step S713 or with the RIP in step S714.

Herein, assumed that the RIP in step S713 and the RIP in step S714 are completed.

In this case, the first RIP engine 240-1 stores the generated first page RIP data 800-1 in the RIP data storage area 266 and sends an RIP response to the job control unit 220 (step S720). Note that the RIP response includes the first page RIP data 800-1. However, in place of the first page RIP data 800-1, the RIP response may include an address, password, and the like of a destination to store the first page RIP data 800-1.

Similarly, the second RIP engine 240-2 stores the generated second page RIP data 800-2 in the RIP data storage area 266 and sends an RIP response to the job control unit 220 (step S721). Note that the RIP response includes the second page RIP data 800-2. However, in place of the second page RIP data 800-2, the RIP response may include an address, password, and the like of a destination to store the second page RIP data 800-2.

Receiving the RIP response of the page, the engine acquisition request unit 222 of the job control unit 220 releases the first RIP engine 240-1 that has been assigned to the first page job data 410-1 on which the RIP has been completed. Similarly, the engine acquisition request unit 222 releases the second RIP engine 240-2 that has been assigned to the second page job data 410-2. In other words, the engine acquisition request unit 222 deletes the page number "first page" and the page number "second page" from the engine management information 600.

When the RIP on the first page job data 410-1 and the RIP on the second page job data 410-2 are completed, the RIP request unit 223 of the job control unit 220 sends an RIP request of the print side to the first RIP engine 240-1 (step S722). Note that the processing request includes the first print side job data 420-1.

In such manners, when the first page RIP data 800-1 and the second page RIP data 800-2 are generated, the RIP request unit 223 requests for the RIP on the first print side job data 420-1. In other words, when the page RIP data 800 of all the pages to be imposed on the print side are generated, the RIP request unit 223 requests for the RIP on the print side job data 420 of the print side.

Receiving the RIP request of the print side, the first RIP engine 240-1 starts the RIP on the first print side job data 420-1 included in the processing request (step S723).

When the RIP in step S723 is completed, the first RIP engine 240-1 stores the generated first print side RIP data 900-1 in the RIP data storage area 266 and also sends an RIP response of the print side to the job control unit 220 (step S724). Note that the RIP response includes the first print side RIP data 900-1. However, in place of the first print side RIP data 900-1, the RIP response may include an address, password, and the like of a destination to store the first print side RIP data 900-1.

Receiving the RIP response of the print side, the engine acquisition request unit 222 of the job control unit 220 releases the first RIP engine 240-1 that has been assigned to the first print side job data 420-1 on which the RIP has been completed. In other words, the engine acquisition request unit 222 deletes the print side number "first print side" from the engine management information 600.

Receiving the RIP response of the print side, the print request unit 224 of the job control unit 220 sends a print request to the print data generation unit 250 (step S725). Note that the print request includes the first print side RIP data 900-1. However, in place of the first prim side RIP data 900-1, the RIP response may include an address, password, and the like of a destination to store the first print side RIP data 900-1.

Receiving the print request, the print data generation unit 250 generates print data and sends the generated print data to the printer 300 (step S726). Accordingly, the printer 300 starts priming of the print data.

In such manners, in the print controller 200 according to the present embodiment, the page RIP data 800 to be imposed on the identical print side is generated in parallel. Furthermore, in the print controller 200 according to the present embodiment, the RIP engines 240 to which no print side job data 420 of another print side is assigned are assigned to the page job data 410 and on the print side job data 420. Therefore, in the print controller 200 according to the present embodiment, it is possible to shorten the time until the start of print processing on the first print side (the print side of the first print medium).

Note that, even in and after step S726, the imposition of the RIP engines 240 on the page job data 410 and the print side job data 420 and the RIP are repeatedly executed.

Figure 9:
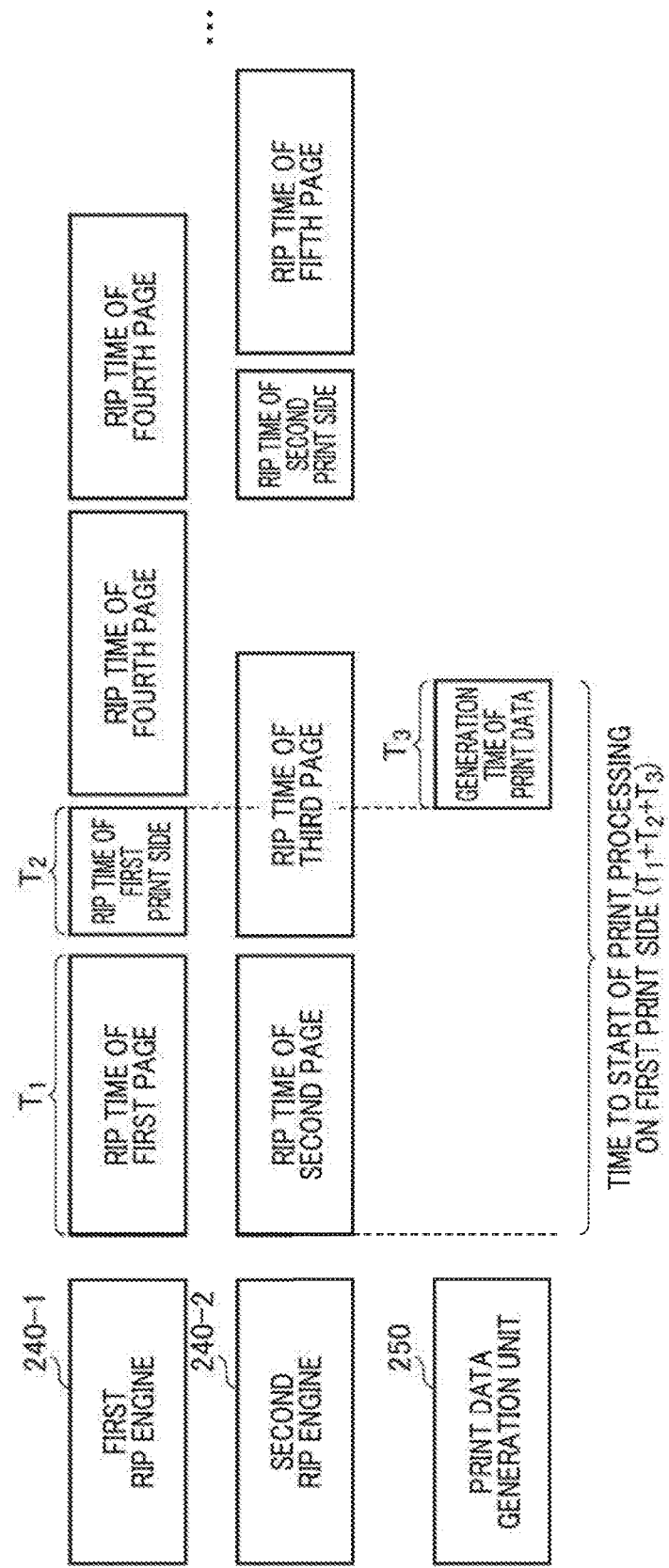
FIG. 9 is a diagram for explaining the time until the start of print processing on a first print side.

The time until the start of the print processing on the first print side will now be described with reference to FIG. 9. FIG. 9 is a diagram for explaining the time until the start of the print processing on the first print side.

As illustrated in FIG. 9, for example, RIP time of each page job data 410 is represented by "$T_1$", RIP time of each print side job data 420 is represented by "$T_2$", and generation time of print data is represented by "$T_3$". In this case, in the print controller 200 according to the present embodiment, the time until the start of the print processing on the first print side is represented as "$T_1+T_2+T_3$" (more precisely, the time includes transmission time and the like of the print data 500 from the print controller 200 to the printer 300).

As described above, the print controller 200 according to the present embodiment performs control so as to generate each page RIP data 800 to be imposed on the print side in parallel and to generate the print side RIP data 900 right after the generation of the page RIP data 800.

Accordingly, the print controller 200 according to the present embodiment is capable of executing the RIP with efficiency. Furthermore, in the print controller 200 according to the present embodiment, it is possible to shorten the time until the start of the print processing on the first print side (the print side of the first print medium).

Therefore, in the print controller 200 according to the present embodiment, it is also possible to shorten the time until the first print medium (first print medium) is output. Thus, for example, the user may be able to immediately check content and the like printed on the first print medium.

The example illustrated in FIG. 9 describes the case where one print medium has one print side. However, when there are two print sides on one print medium, the generation of the print data 500 is performed after the second print side RIP data 900-2 is generated.

Furthermore, in the example illustrated in FIG. 9, the RIP time of each page job data 410 is represented by "$T_1$", but more precisely, the value of "$T_1$" varies for each page job data 410. Similarly, the RIP time of each print side job data 420 is represented by "$T_2$", but more precisely, the value of "$T_2$" varies for each print side job data 420.

<Processing Executed by the Sob Control Unit 220 of the Print Controller 200>

Figure 10:
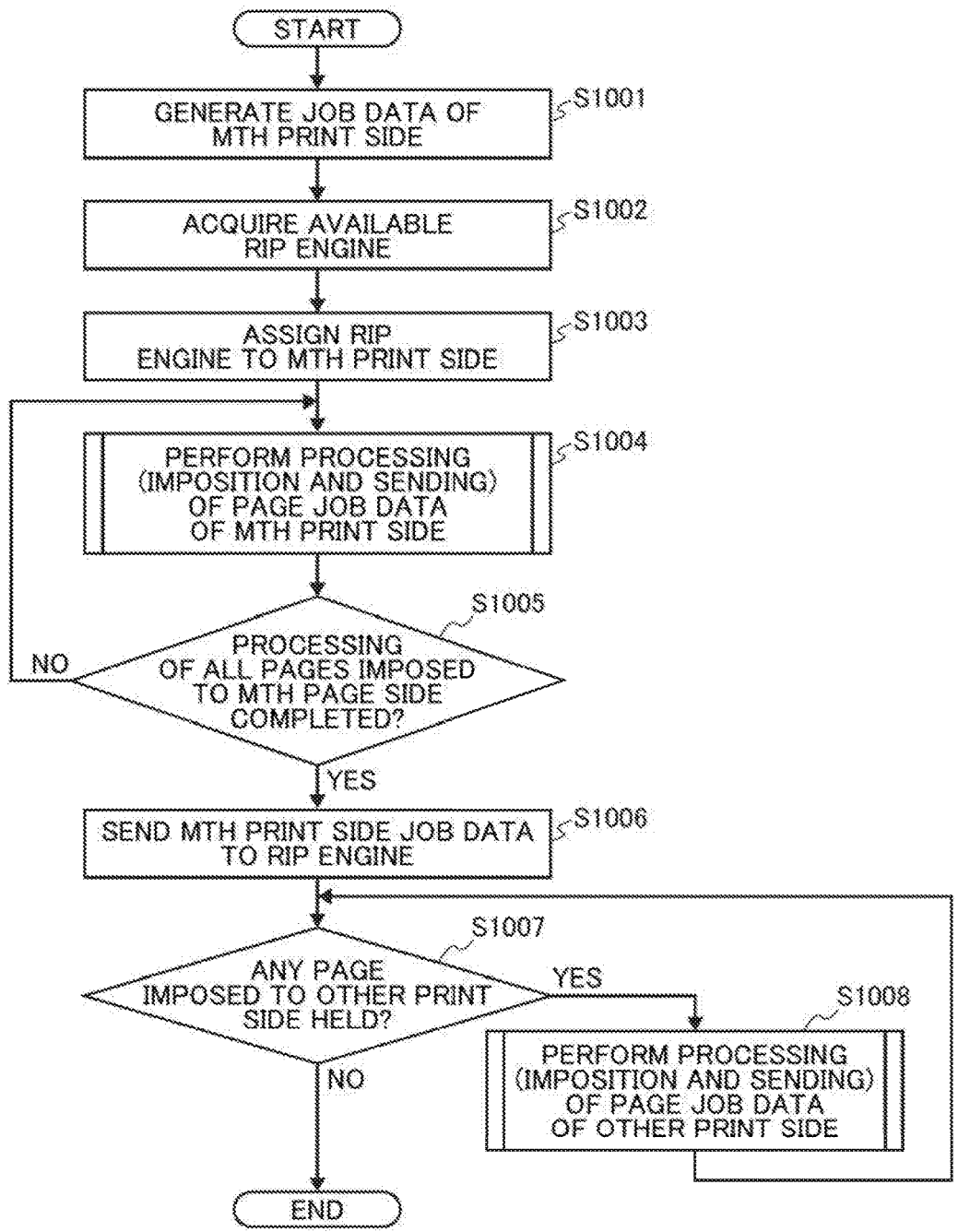
FIG. 10 is a flowchart illustrating an example of processing executed by a job control unit when the print controller receives print job data.

With reference to FIG. 10, hereinafter described is processing executed by the job control unit 220 when the print controller 200 receives the print job data 400. FIG. 10 is a flowchart illustrating an example of processing executed by the job control unit 220 when the print controller 200 receives the print job data 400. Hereinafter described is an exemplary case where an available RIP engine 240 held in advance is assigned instead of acquiring an available RIP engine 240 when one of the RIP engines 240 is assigned to the page job data 410.

Note that the job control unit 220 repeatedly executes the processing illustrated in FIG. 10 with respect to m=1, 2, . . . , M.

First, the imposition processing unit 221 of the job control unit 220 acquires the imposition information 700 and then generates m-th print side job data 420-$m$ based on the acquired imposition information 700 (step S1001).

Next, the engine acquisition request unit 222 of the job control unit 220 acquires the available RIP engines 240 from the RIP control unit 230 (step S1002). In other words, the job control unit 220 acquires the RIP engine IDs of the available RIP engines 240 by sending an acquisition request of the RIP engines 240 to the RIP control unit 230. Note that the available RIP engines 240 represent RIP engines 240 that are not assigned to other print sides (that is, "first print side" to "(m−1)th print side") as mentioned above.

Next, the engine acquisition request unit 222 of the job control unit 220 assigns an RIP engine 240 to the m-th print side job data 420-$m$ out of the RIP engines 240 acquired in step S1002 (step S1003).

Next, the job control unit 220 executes processing on the page job data 410 related to the m-th print side (step S1004). In other words, the job control unit 220 performs assignment of the RIP engine 240 on the page job data 410 of a page number associated with the m-th print side in the imposition information 700 and an RIP request with respect to the assigned RIP engine 240. Details of step S1004 will be described later.

Next, the job control unit 220 determines whether the processing in step S1004 has been executed on the page job data 410 of all page numbers associated with the m-th print side (step S1005).

When it is determined in step S1005 that the processing in step S1004 has been executed on the page job data 410 of all the page numbers associated with the m-th print side, the job control unit 220 proceeds to step S1006. In other words, the RIP request unit 223 of the job control unit 220 sends the m-th print side job data 420-m to the RIP engine 240 assigned in step S1003 (step S1006). Accordingly, the RIP request unit 223 may be able to make the RIP request of the print side.

Next, the job control unit 220 determines whether there are data on hold in the page job data 410 of page numbers associated with other print sides (that is, "first print side" to "(m−1)th print side") in the imposition information 700 (step S1007). Herein, the term "on hold" represents that the assignment of the RIP engine 240 is on hold.

When it is determined in step S1007 that there are page job data 410 on hold, the job control unit 220 proceeds to step S1008. In other words, the job control unit 220 performs the assignment of the RIP engine 240 and the RIP request of the assigned RIP engine 240 with respect to the page job data 410 on hold. The processing in step S1008 is similar to the processing in step S1004.

On the other hand, when it is determined in step S1007 that there is no page job data 410 on hold, the job control unit 220 ends the processing.

Figure 11:
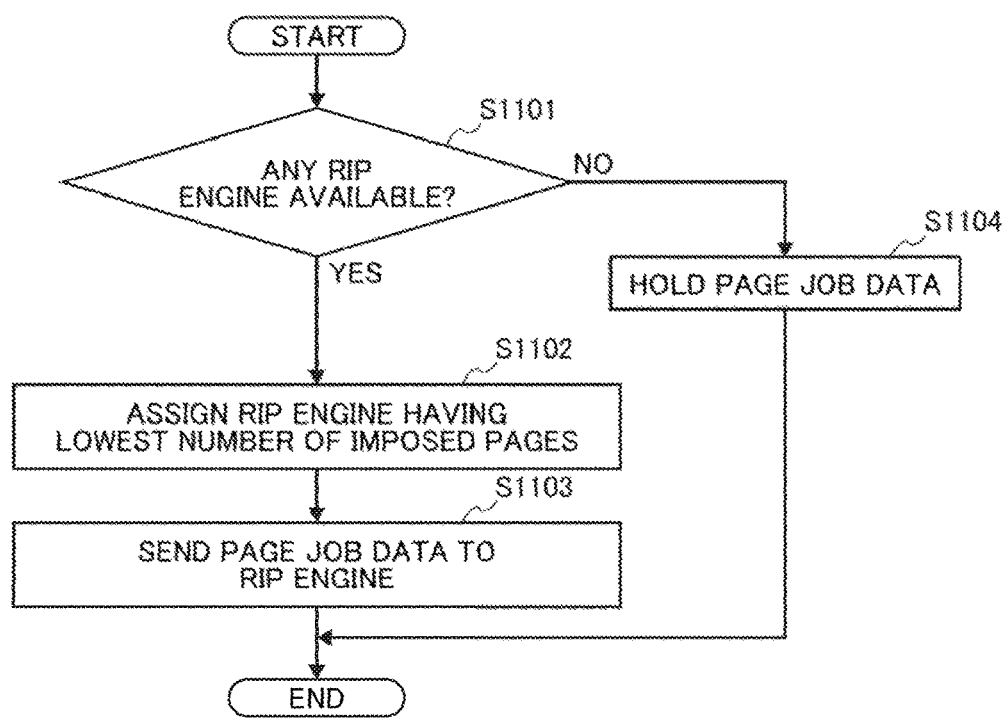
FIG. 11 is a flowchart illustrating details of processing in step S1003 and step S1007 in FIG. 10.

Details of the processing in step S1004 and step S1008 will now be described with reference to FIG. 11. FIG. 11 is a flowchart illustrating the details of the processing in step S1004 and step S1008 in FIG. 10. Hereinafter, the page job data 410 of the page number associated with the m-th print side in the step S1004 and the page job data 410 on hold in the step S1008 are not distinguished from each other and represented by "the corresponding page job data 410".

First, the job control unit 220 determines whether there are available RIP engines 240 (step S1101). In other words, the job control unit 220 determines whether the number of RIP engine IDs acquired in step S1002 is 1 or more.

When it is determined in step S1101 that there are available RIP engines 240, the job control unit 220 proceeds to step S1102. In this case, among the available RIP engines 240, the engine acquisition request unit 222 of the job control unit 220 assigns an RIP engine 240 having the smallest assignment number of page job data 410 with respect to the corresponding page job data 410 (step S1102).

Among the available RIP engines 240, the engine acquisition request unit 222 may also assign, for example, an RIP engine 240 having the assignment number equal to or less than a predetermined number and the smallest assignment number with respect to the corresponding page job data 410.

Next, the RIP request unit 223 of the job control unit 220 sends the corresponding page job data 410 to the RIP engine 240 assigned in step S1102 (step S1103). Accordingly, the RIP request unit 223 may be able to make the RIP request of the page.

On the other hand, when it is determined in step S1001 that there is no available RIP engine 240, the job control unit 220 proceeds to step S1104. In this case, the job control unit 220 regards the corresponding page job data 410 as being on hold (step S1104).

As described above, in the print controller 200 according to the present embodiment, the RIP engine 240 that is not assigned to the first print side job data 420-1 to the (m−1)th print side job data 420-(m−1) is assigned to the m-th print side job data 420. Furthermore, in the print controller 200 according to the present embodiment, among the RIP engines 240, an RIP engine 240 having a small assignment number of page job data 410 is assigned to the page job data 410 of the page number associated with the m-th print side in the imposition information 700.

Accordingly, in the print controller 200 according to the present embodiment, it is possible to efficiently execute the RIP on the page job data 410 and the print side job data 420, and to shorten the time until the start of the print processing on the first print side.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:
1. A print controller, comprising:
a receiver configured to receive, from a terminal device connected to the print controller, a print job in which imposition printing is set;
processing circuitry configured to
generate print side job data for imposing a plurality of pages on a single print side, based on information indicating the imposition printing set in the print job received by the receiver;
assign a first image processing engine, of a plurality of image processing engines, which is not assigned to other print side job data for imposing a plurality of pages on another print side, to the generated print side job data;
assign at least one second image processing engine, of the plurality of image processing engines, which is not assigned to the other print side job data, to page job data of each of the plurality of pages to be imposed on the single print side among a plurality of pieces of page job data included in the print job received by the receiver;
request the assigned at least one second image processing engine to execute image processing on the page job data of each of the plurality of pages to be imposed on the single print side; and
request the assigned first image processing engine to execute image processing on the print side job data when the image processing on the page job data of each of the plurality of pages to be imposed on the single print side is completed, wherein the processing circuitry is further configured to assign the page job data of the plurality of pages to be imposed on the single print side to at least two different image processing engines of the plurality of image processing engines that are not assigned to the other print side job data.

2. The print controller according to claim 1, wherein the information indicating the imposition printing includes information in which print side information indicating the single print side and page information of the plurality of pages to be imposed on the single print side are associated with each other, and wherein the processing circuitry is further configured to generate the print side job data including the page information of the plurality of pages to be imposed on the single print side, and wherein the processing circuitry is further configured to assign the at least one second image processing engine of the plurality of image processing engines, which is not assigned to the other print side job data, to page job data of each of the plurality of pages corresponding to the page information included in the print side job data among the plurality of pieces of page job data included in the print job received by the receiver.

3. The print controller according to claim 1, wherein the information indicating the imposition printing includes information in which print side information indicating the single print side and page information of the plurality of pages to be imposed on the single print side are associated with each other, and wherein, with reference to the information indicating the imposition printing, the processing circuitry is further configured to assign the at least one second image processing engine of the plurality of image processing engines, which is not assigned to the other print side job data, to page job data of each of the plurality of pages corresponding to the page information associated with the print side job data generated by the processing circuitry among the plurality of pieces of page job data included in the print job received by the receiver.

4. The print controller according to claim 1, wherein the processing circuitry is further configured to assign, as the at least one second image processing engine, an image processing engine of the plurality of image processing engines, which is not assigned to the other print side job data and has an assigned number of page job data equal to or smaller than a threshold number, to the page job data of each of the plurality of pages to be imposed on the single print side.

5. The print controller according to claim 1, wherein the processing circuitry is further configured to generate print data for printing image data generated by the image processing of the print side job data with a printer connected to the print controller, when the image processing of the print side job data is completed.

6. The print controller according to claim 1, wherein each of the plurality of image processing engines is configured to execute raster image processing.

7. A print control method for a print controller including a plurality of image processing engines, the print control method comprising:

receiving, from a terminal device connected to the print controller, a print job in which imposition printing is set;

generating print side job data for imposing a plurality of pages on a single print side, based on information indicating the imposition printing set in the print job received by the receiving;

first assigning a first image processing engine of the plurality of image processing engines, which is not assigned to other print side job data for imposing a plurality of pages on another print side, to the generated print side job data;

second assigning at least one second image processing engine of the plurality of image processing engines, which is not assigned to the other print side job data, to page job data of each of the plurality of pages to be imposed on the single print side among a plurality of pieces of page job data included in the received print job;

first requesting the at least one second image processing engine assigned by the second assigning to execute image processing on the page job data of each of the plurality of pages to be imposed on the single print side; and second requesting the image processing engine assigned by the first assigning to execute image processing on the print side job data when the image processing on the page job data of each of the plurality of pages to be imposed on the single print side is completed, wherein the method further comprises assigning the page job data of the plurality of pages to be imposed on the single print side to at least two different image processing engines of the plurality of image processing engines that are not assigned to the other print side job data.

8. A non-transitory recording medium storing a program to cause a print controller including a plurality of image processing engines to perform a print control method, the print control method comprising:

receiving, from a terminal device connected to the print controller, a print job in which imposition printing is set;

generating print side job data for imposing a plurality of pages on a single print side, based on information indicating the imposition printing set in the print job received by the receiving;

first assigning a first image processing engine of the plurality of image processing engines, which is not assigned to other print side job data for imposing a plurality of pages on another print side, to the generated print side job data;

second assigning at least one second image processing engine of the plurality of image processing engines, which is not assigned to the other print side job data, to page job data of each of the plurality of pages to be imposed on the single print side among a plurality of pieces of page job data included in the received print job;

first requesting the at least one second image processing engine assigned by the second assigning to execute image processing on the page job data of the plurality of pages to be imposed on the single print side; and second requesting the image processing engine assigned by the first assigning to execute image processing on the print side job data when the image processing on the page job data of each of the plurality of pages to be imposed on the single print side is completed, wherein the method further comprises assigning the page job data of the plurality of pages to be imposed on the single print side to at least two different image processing engines of the plurality of image processing engines that are not assigned to the other print side job data.

* * * * *